United States Patent
Shepshelovich et al.

(10) Patent No.: US 10,144,499 B2
(45) Date of Patent: *Dec. 4, 2018

(54) AEROFOIL ACCESSORIES AND METHOD FOR MODIFYING THE GEOMETRY OF A WING ELEMENT

(75) Inventors: Michael Shepshelovich, Ganei Tikva (IL); Alex Nagel, Kiryat Ono (IL); Danny Abramov, Rehovot (IL)

(73) Assignee: ISRAEL AEROSPACE INDUSTRIES LTD., Lod (IL)

(*) Notice: Subject to any disclaimer, the term of this patent is extended or adjusted under 35 U.S.C. 154(b) by 429 days.

This patent is subject to a terminal disclaimer.

(21) Appl. No.: 13/119,315

(22) PCT Filed: Sep. 16, 2009

(86) PCT No.: PCT/IL2009/000904
§ 371 (c)(1),
(2), (4) Date: Mar. 16, 2011

(87) PCT Pub. No.: WO2010/032241
PCT Pub. Date: Mar. 25, 2010

(65) Prior Publication Data

US 2011/0163205 A1    Jul. 7, 2011

(30) Foreign Application Priority Data

Sep. 17, 2008 (IL) .......................... 194155
Sep. 17, 2008 (IL) .......................... 194156

(51) Int. Cl.
*B64C 3/14*    (2006.01)
*B64C 3/48*    (2006.01)
*B64C 3/44*    (2006.01)

(52) U.S. Cl.
CPC ............... *B64C 3/48* (2013.01); *B64C 3/14* (2013.01); *B64C 3/44* (2013.01);
(Continued)

(58) Field of Classification Search
CPC .... B64C 3/48; B64C 3/44; B64C 3/14; B64C 2003/142; B64C 2003/148
(Continued)

(56) References Cited

U.S. PATENT DOCUMENTS 1,353,666 A * 9/1920 Page .............................. 244/210
1,480,327 A * 1/1924 Wisenant .................... 244/35 R
(Continued)

FOREIGN PATENT DOCUMENTS

GB         2 374 331 A      10/2002

OTHER PUBLICATIONS

International Search Report, International Application No. PCT/IL2009/000904, dated Feb. 11, 2010.
(Continued)

*Primary Examiner* — Marc Burgess
(74) *Attorney, Agent, or Firm* — Dorsey & Whitney LLP

(57) ABSTRACT

Aerofoil accessories are provided, configured for selective attachment to a wing element, the wing element having an outer facing aerofoil surface and being based on at least one datum aerofoil section. Each accessory provides a modified geometric profile to a datum profile of the at least one aerofoil section when attached to the wing element. The accessories are each configured for having a substantially fixed geometric profile with respect to the at least one datum aerofoil section at least whenever said wing element is airborne with the respective accessory attached to the wing element. The modified geometric profile is such as to provide said wing element with the accessory attached thereto with a desired change in performance relative to a datum performance provided by the wing element absent the accessory. A kit is also provided for enhancing performance
(Continued)

of a wing element in off-design conditions. A method is also provided for enhancing performance of a wing element in adverse conditions.

18 Claims, 7 Drawing Sheets

(52) U.S. Cl.
CPC .. *B64C 2003/142* (2013.01); *B64C 2003/148* (2013.01); *Y02T 50/12* (2013.01); *Y02T 50/14* (2013.01)

(58) Field of Classification Search
USPC ............ 244/211–217, 123.1, 130, 219, 198, 244/199.1, 200
See application file for complete search history.

(56) References Cited

U.S. PATENT DOCUMENTS

| | | | | |
|---|---|---|---|---|
| 2,036,905 | A | * | 4/1936 | Weick ................. B64C 3/58 244/198 |
| 2,135,887 | A | * | 11/1938 | Fairey ............................. 416/23 |
| 2,261,363 | A | * | 11/1941 | Griswold ................... 244/90 A |
| 2,378,528 | A | * | 6/1945 | Arsandaux .................... 244/219 |
| 2,934,289 | A | | 4/1960 | Dzik |
| 2,937,826 | A | | 5/1960 | Johnson |
| 3,136,501 | A | * | 6/1964 | Barber ......................... 244/219 |
| 3,298,636 | A | * | 1/1967 | Arnholdt ...................... 244/198 |
| 3,794,275 | A | * | 2/1974 | Satter .......................... B64C 9/323 244/200 |
| 3,847,369 | A | * | 11/1974 | Phillips et al. ............... 244/210 |
| 4,227,665 | A | * | 10/1980 | Carlson et al. .............. 244/210 |
| 4,422,606 | A | * | 12/1983 | Munroe ........................ 244/203 |
| 5,213,287 | A | * | 5/1993 | Barron ........................ 244/130 |
| 5,294,080 | A | | 3/1994 | Ross |
| 5,322,246 | A | | 6/1994 | Henne et al. |
| 5,395,071 | A | | 3/1995 | Felix |
| 5,651,513 | A | | 7/1997 | Arena |
| 6,015,117 | A | * | 1/2000 | Broadbent .................... 244/214 |
| 6,293,497 | B1 | | 9/2001 | Kelley-Wickemeyer et al. |
| 6,328,265 | B1 | | 12/2001 | Dizdarevic |
| 6,360,997 | B1 | | 3/2002 | Saiz |
| 6,443,394 | B1 | | 9/2002 | Weisend, Jr. |
| 6,905,092 | B2 | | 6/2005 | Somers |
| 6,910,662 | B1 | * | 6/2005 | Ofner ........................... 244/219 |
| 7,195,210 | B2 | | 3/2007 | Hamilton et al. |
| 7,980,515 | B2 | * | 7/2011 | Hunter ......................... 244/198 |
| 7,992,827 | B2 | | 8/2011 | Shepshelovich et al. |
| 8,777,580 | B2 | * | 7/2014 | Eisenberg ................. 416/244 R |
| 2004/0195464 | A1 | * | 10/2004 | Vassberg et al. ............. 244/216 |
| 2006/0169848 | A1 | * | 8/2006 | Libby ........................... 244/216 |
| 2007/0278354 | A1 | | 12/2007 | Shepshelovich et al. |
| 2011/0168850 | A1 | * | 7/2011 | Shepshelovich et al. .... 244/216 |

OTHER PUBLICATIONS

Written Opinion of the International Searching Authority, International Application No. PCT/IL2009/000904, dated Feb. 11, 2010.
Abbot, I. H., and Doenhoff, A.E., "Theory of Wing Sections", Dover Publications, Inc., New York, 1959, pp. 228-229 (4 pages).
U.S. Department of Transportation, Federal Aviation Administration, "Aircraft Icing Handbook", DOT/FAA/CT-88/8-1, Mar. 1991, (390 pages).
Abramov, D., Shepshelovich, M., "Ice Accretion of Two-Element High-Lift UAV Wings", 53rd Israel Annual Conference on Aerospace Sciences, Mar. 6-7, 2013, pp. 1-29.
Abbot, I. H., and Doenhoff, a.E., "Theory of Wing Sections", Dover Publications, Inc., New York, 1959, pp. 215,217.

* cited by examiner

AEROFOIL ACCESSORIES AND METHOD FOR MODIFYING THE GEOMETRY OF A WING ELEMENT

This is a National Phase Application filed under 35 U.S.C. § 371 as a national stage of PCT/IL2009/000904, filed on Sep. 16, 2009, an application claiming the benefit under 35 U.S.C. § 119 of Israeli Patent Application No. 194155, filed on Sep. 17, 2008, and an application claiming the benefit under 35 U.S.C. § 119 of Israeli Patent Application No. 194156, filed on Sep. 17, 2008, the content of each of which is hereby incorporated by reference in its entirety.

FIELD OF THE INVENTION

This invention relates to aircraft, wings and aerofoils, and in particular to accessories therefore.

BACKGROUND OF THE INVENTION

Geometric profiles of aerofoils, including wings, propeller blades, rotor/turbine blades, stabilizers, and so on, are in general optimized for a design set of conditions or a mission profile, for example high lift, endurance, low drag and so on. Nevertheless, devices such as leading edge slats and/or trailing edge flaps, permit the geometry of the aerofoil to be varied to a limited degree while airborne, and thus enable operation of the aerofoil at other conditions.

However, aircraft that need at times to operate under a wide range of different conditions may incorporate aerofoil geometries that provide adequate performance for the range of conditions, albeit at a performance loss as compared with the optimum performance that may be obtained at any specific set of conditions with an aerofoil geometry designed for such a set of conditions.

By way of general background, a number of inflatable or shape changing devices are known for altering the shape of aerofoils. For example, in U.S. Pat. No. 6,443,394, an airfoil device is provided for attachment to the wing of an aircraft. The airfoil device has a chamber which is inflatable to provide a lift-enhancing airfoil geometry to the wing and other chambers which are inflatable to provide deicing forces to remove ice accumulation on the wing. When installed on the wing, the airfoil device closely conforms to the wing's airfoil geometry (e.g., low camber, sharp leading edge) when the lift-enhancing chamber and the deicing chambers are in a deflated condition. The lift-enhancing chamber can be inflated during take-off and landing to provide a high camber and less sharp airfoil geometry. If ice accumulates on the wing during high speed flight, the deicing chambers can be repeatedly inflated/deflated for ice removal purposes. As another example, in U.S. Pat. No. 7,195,210, an airfoil member is provided including a geometric morphing device. The geometric morphing device has an inflatable member. The inflatable member has an exterior wall and multiple inflated states. Multiple layers are coupled to at least a portion of the exterior wall and control size, shape, and expansion ability of the geometric morphing device. The geometric morphing device is adjustable in size and shape by changing inflated state of the inflatable member. An airfoil member altering system and a method of performing the same are also provided as well as a method of forming the geometric morphing device.

There are also improvements that may be desired to be incorporated to an existing aerofoil design. For example, US2007/0278354, assigned to the present Assignee, and the contents of which are incorporated herein in their entirety, discloses a high lift, two-element, mild stall wing based on a corresponding high lift, two-element, mild stall aerofoils. An aerodynamic feature referred to as a mild stall ramp, or MS-ramp, is provided at the aft portion of the main body of the aerofoil, on the suction surface thereof, while retaining the bluntness of the leading edge of the aerofoil. Gradual development of separated flow on the MS-ramp, combined with continuous lift build-up at the forward portion of the aerofoil produces mild stall characteristics at the extended range of post-stall angles of attack, and combines features of adaptive geometry with stall/post-stall flight capabilities at the level of maximum lift that is inherent to two-element aerofoils.

SUMMARY OF THE INVENTION

The present invention relates to methods and devices for effectively changing or modifying the aerofoil profile of a wing element or the like. At least some of the embodiments of the invention relate to slotted aerofoils, while at least some embodiments may relate to single element aerofoils.

Herein, the term "slotted airfoil" refers to two-element airfoils composed of a first element (also referred to as a primary aerofoil element), the main aerofoil body, and a second element (also referred to as a secondary aerofoil element), in the form of a flap or aileron segment. The second element of slotted airfoils is permanently separated from the main body by a slot which is substantially open for the airflow at any deflection of the flap, and the second element does not retract to a retracted position that results in the substantially closed aerodynamic contours of a single-element airfoil. A feature of this structure is that it facilitates actuation of the second element through positive or negative deflection angles. Another feature of this structure is that a box-like relatively rigid construction may be achieved. With the second aerofoil element optionally coupled to actuators, the slotted airfoils of the invention provide the features of adjustable geometry and have built-in options for operating as take-off/landing flaps, ailerons, airbrake and for providing decambering at maximum speed flight. Slotted airfoils according to at least some embodiments of the invention are mission-adaptive, two-element, high-lift arrangements, and are inherently high-lift airfoils that are particularly suitable for development of long endurance UAV and other aircraft, loitering at high lift coefficients, in particular under unfavorable conditions in which contaminants could potentially cause an accretion problem and/or increase turbulent flow.

Slotted airfoils according to at least some embodiments of the invention are essentially high-lift wing sections that benefit from the airflow through the slot of two-element arrangement to achieve high maximum lift, and in which passage of contaminants through the gap and onto the second element is minimized or avoided. Positive flap deflections of the second element of these airfoils may produce a further enhancement of maximum lift, and an improvement in minimizing or avoiding accretion of contaminants, but this may be accompanied with some degradation of their stall characteristics.

The present invention also relates to an air vehicle comprising wings according to the invention. The wings may be the main lift-producing wings of said air vehicle. For example, the air vehicle may be an Unmanned Air Vehicle (UAV), in particular configured for long range endurance and loitering.

According to one aspect of the invention, at least one aerofoil accessory is provided configured for selective attachment to a wing element, the wing element having an outer facing aerofoil surface and being based on at least one datum aerofoil section, said accessory providing a modified geometric profile to a datum profile of said at least one aerofoil section when attached to said wing element, said accessory having a substantially unchanged or fixed geometric profile with respect to said at least one datum aerofoil section at least whenever said wing element is airborne with said accessory attached to said wing element. The modified geometric profile provided by attaching the accessory to the wing element may be such as to provide said wing element with said accessory attached thereto with a desired change in performance relative to a datum performance provided by the wing element absent said accessory. For example, such a change in performance may be an improvement in performance in any one of: mild stall performance, high lift performance at low speeds, sensitivity of the wing element to contaminants such as for example snow or ice accretion, rain or water droplets, sand, smoke particles, dust particles, and so on. Such an accessory may help to avoid or minimize otherwise adverse effects associated with flight under such conditions, preventing deterioration of maximum lift, stall characteristics, and/or the efficiency and effectiveness of the secondary element, which may be used as a flap/aileron.

The accessory generally comprises an outward facing accessory surface having an accessory geometric profile defined between a first edge and a second edge of said accessory, said edges being generally transverse to the plane of the aerofoil, and configured for mating with at least a portion of said wing surface when said accessory is attached to said wing element such as to overlie and effectively replace at least a portion of said wing surface with said accessory surface to provide said modified geometric profile.

In some embodiments, said first edge is a forward edge and located downstream of a leading edge of said at least one aerofoil section, and said second edge is an aft edge located upstream of a trailing edge of said at least one aerofoil section.

The accessory comprises a suitable interface for enabling attaching the accessory to said at least portion of said wing surface. For example, the interface may comprise a mating surface having a form substantially complementary to the form of the portion of the wing surface onto which the accessory is to be attached or otherwise mounted. Attachment may be permanent or reversible, and may be performed using any suitable mechanical arrangement such as bolts, screw, rivets and so on, and/or using adhesives.

In some embodiments, said at least one aerofoil section comprises a two-element aerofoil section, comprising a main primary element and a secondary element separated from said primary element via a gap, and wherein said accessory is attachable to said primary element.

In one embodiment, the accessory is configured for being attached to a suction surface of said wing element and configured for effectively providing said modified profile with at least a change in a suction surface profile thereof with respect to said datum profile. Such an accessory may provide the wing section with improvements in mild stall performance, depending on the specific change in profile to the datum aerofoil section provided by the accessory. For example, the accessory is configured for being attached to a suction surface of said wing element and configured for effectively providing high lift mild stall performance relative to said wing section absent said accessory. For example, said at least one aerofoil section may comprise a two-element aerofoil section, comprising a main primary element and a secondary element separated from said primary element via a gap, and said accessory may comprise an outwardly facing suction surface having a local curvature that may increase, and/or that may remain substantially constant, along the chord in a direction towards a trailing edge of the primary element, when the accessory is attached to the wing element.

In another embodiment, the accessory is configured for being attached to a pressure surface of said wing element and configured for effectively providing said modified profile with at least a change in a pressure surface profile thereof with respect to said datum profile. Such an accessory may provide the wing section with improvements in avoiding or minimizing contaminant accretion on the second element of a two-element aerofoil, depending on the specific change in profile to the datum aerofoil section provided by the accessory. A feature of at least this embodiment and/or some variations of this embodiment of the invention is that in adverse icy conditions, for example, ice accretion on the second aerofoil element is reduced or altogether avoided, which could otherwise produce severe deterioration of control of, and/or of the efficiency or lift generated by, the aerofoil—which in extreme cases could prevent rotation of the second element and lead to complete loss of control power. The profile of the main element of the aerofoil with respect to the secondary element, as modified by the accessory, and/or one or both of the location and orientation of the secondary element with respect to the primary aerofoil element can provide a beneficial shielding effect on the secondary element, preventing ice formation on the leading edge thereof. At the same time, this is achieved while providing attached flow around the primary and secondary elements, and through the slot. The provision of such accessories in the form of removable panels or elements on the lower surface of the aerofoil provides an efficient way of avoiding or minimizing ice accretion, for example, on the second element when the air vehicle is expected to operate in unfavorable weather conditions, while enabling the accessory to be removed prior to undertaking missions in which the weather conditions are not expected to pose an accretion problem, thereby providing great versatility to enabling operation of the air vehicle in a wide variety of conditions.

The pressure surface accessory may comprise an outwardly facing surface comprising an accessory profile configured for minimizing or preventing flow into said gap of said contaminants that may be flowing along or proximate to a boundary layer over said pressure surface. The accessory profile may be further configured to enable airflow through said gap for enabling aerodynamic operation of said two element aerofoil, and further configured such that airflow through said gap is generally consistent with providing high lift aerodynamic characteristics to said aerofoil. The accessory, when attached to the aerofoil, maybe configured to provide a modified aerofoil profile configured to ensure that at least some streamlines proximate to the modified pressure surface of said primary aerofoil element follow a path including over a suction surface of said secondary aerofoil element via said gap, while concurrently providing a trajectory to contaminants flowing proximate to the modified pressure surface of said primary aerofoil element such as to cause said contaminants to overshoot said gap. The contaminants may comprise, for example, particulate matter including for example at least one of ice, snow, rain, water droplets, sand, smoke particles or dust particles. The accessory surface profile may extend outwardly along at least a portion of the chord of said primary aerofoil element with respect to the original pressure surface profile of the aerofoil. In at least some embodiments, the accessory surface profile comprises a convex curvature between a forward edge and an aft edge of the accessory. In at least some other embodiments, the pressure surface profile comprises an upstream concave portion configured for imparting a centrifugal force component to said particulate matter, and a downstream convex portion joined thereto at an inflexion point.

In yet other embodiments, the accessory may be configured for being attached to a leading edge of said wing element and configured for effectively providing said modified profile with a change in a leading edge profile thereof with respect to said datum profile. Such an accessory may provide the wing section with high lift, particularly in unfavorable weather conditions and other conditions that result in a fully turbulent wing, and/or for the enhancement of take-off and landing performance, for example for particularly heavy configurations, depending on the specific change in profile/aerodynamics to the datum aerofoil section provided by the accessory. In variations of these embodiments, the accessory is configured for providing a gap with respect to a leading edge portion of said datum aerofoil profile.

The aerofoil section may comprise a single element aerofoil section, or a two-element aerofoil section, comprising a main primary element and a secondary element separated from said primary element via a gap, and wherein said accessory is attachable to said primary element. Some of the accessories according to the invention are applicable, mutatis mutandis, to both single element aerofoils and to two-element aerofoils, for example the aforesaid accessory that is configured for being attached to a leading edge of said wing element, while other accessories are applicable to two-element aerofoils, as will become clearer herein.

At least in some embodiments the accessory need not be made from a high stress-bearing material, as all flight stresses may be transmitted to the wing element. Alternatively, the accessory may be made from suitable load being materials, for example where as the position and/or shape of the accessory with respect to the datum aerofoil is such as to induce stresses to the accessory.

In at least some embodiments, the accessory is of fixed geometry.

According to some embodiments of the invention, a non-inflatable aerofoil accessory is provided for attaching to a wing element, said wing element being based on at least one datum aerofoil, the accessory comprising a first surface comprising an interface configured for enabling securement or attachment to said wing element, and at least a first edge and a second edge displaced from said first edge with respect to the wing element, said first and second edges configured for conforming to a surface of said wing element;

a second surface extending from said first edge to said second edge and comprising an aerodynamically contoured profile, said second surface being displaced from said first surface;

wherein said aerodynamically contoured profile is such as to provide the datum aerofoil with a modified aerodynamic profile when said accessory is attached to said aerofoil, wherein the modified aerodynamic profile is designed to provide a modified or improved performance over said datum profile.

In other embodiments, the accessory may be inflatable, achieving the desired profile when inflated, but is nevertheless substantially non-inflatable, i.e. assumes a non-inflatable configuration, at least when said wing element is airborne. Where the accessory is inflatable, it is also configured for being inflated exclusively when said wing element is not airborne.

The present invention is also directed to a wing element based on at least one aerofoil section, and comprising an aerofoil accessory according to the invention. The wing element may comprise, for example, part or all of any one of: a lift-generating wing, canard, tailplane, stabilizer, fin, rotor blade and so on, mutatis mutandis.

The present invention is also directed to an air vehicle comprising a pair of lift providing wings, each wing comprising at least one wing element incorporating an aerofoil accessory according to the invention. While said air vehicle may comprise an unmanned air vehicle (UAV), the invention may also be applied to manned aircraft, mutatis mutandis, in particular to general aviation, sailplanes, subsonic transport, naval aviation, guided or other weapons, and so on.

The present invention is also directed to a method for modifying a geometry of a wing element comprising attaching an aerofoil accessory to the wing element according to the invention. The method may further comprise subjecting said wing element to predetermined conditions whereby to cause a desired change in performance of said wing element with said accessory attached thereto relative to a datum performance provided by the wing element absent said accessory at said predetermined conditions.

A feature of at least some embodiments of the invention is that the shape of a wing element may be changed as desired in a simple, cost effective and yet effective manner, without the need for inflation apparatus, conduits, complex mechanical systems, and so on, and in a manner that is fixed at least during flight. Another feature of at least some embodiments of the invention is that the accessories may be configured as substantially maintenance-free modules, each of which may be independently attached to and removed from the wings as desired, enabling simple and effective replacement of an accessory when required. At the same time, the original shape of the wing element may be restored when desired by removing the accessory. Such a feature allows retrofitting, and essentially enables, for example, an MS-ramp to be incorporated retroactively to an existing two element slotted aerofoil design, without the need to replace the wings or sections of the wing. Rather, accessories according to at least some embodiments of the invention, in the form of the MS-ramp, but having a lower surface contoured to match the aft portion of the suction surface of the leading element of the aerofoil may be manufactured from any suitable material, and the accessory attached to the wing element in a suitable manner, thereby altering the aerofoil sections threat to conform to that desired for providing a mild stall slotted aerofoil design.

Another feature of at least some embodiments of the invention is that the wing section onto which the accessory is to be mounted or attached does not require substantial modification. For example, even where the accessory is inflatable, there is no need for complex piping and pressurization systems in the air vehicle itself for controlling and causing inflation of the accessory while airborne. Rather, the appropriate shape is provided by inflating the accessory while the aircraft is still on the ground, and the inflated, fixed-geometry accessory is then affixed to the wing while the aircraft is still on the ground.

Thus, according to an aspect of the invention, the accessory may be made as an inflatable body that assumes the desired profile when inflated, for example with a suitable pressurized gas or with a suitable liquid. However, the inflated configuration is fixed at least whenever the wing element is airborne, and in normal operation the accessory can only be inflated or deflated once the aircraft comprising the wing element has landed and is serviced in this manner by ground personnel. The accessory is thus not configured for being selectively inflated or deflated during flight, and thus does not require aircraft mounted inflation/deflation systems, though of course may be deflated when airborne if damaged. Herein, by the accessory having a substantially unchanged geometric profile at least whenever the wing element is airborne, and the accessory is attached to said wing element, is meant during normal operation of the accessory, and when the accessory is not damaged to the extent that it leaks the enclosed pressurizing gas.

Another feature of at least some embodiments of the invention is that the accessories may be adopted by existing aircraft configurations in a simple manner, and for a variety of different air vehicles. Installations may be performed on the ground.

According to another aspect of the invention, there is provided a kit for enhancing performance of a wing element in adverse conditions, the wing element being based on a two-element aerofoil section, comprising a main primary element and a secondary element separated from said primary element via a gap, the kit comprising at least one fixed geometry aerofoil accessory that is selectively attachable to the wing element to provide a modified aerofoil profile with respect to a datum aerofoil profile to provide said enhanced performance, said aerofoil accessory comprising at least one of:

a first accessory, comprising a suction surface accessory for providing or enhancing mild stall performance;

a second accessory, comprising a pressure surface accessory configured for minimizing or avoiding accretion of contaminant on said secondary aerofoil element when subjected to an airflow comprising said contaminant, at least at said off-design; and a third accessory, comprising a leading edge slot accessory for providing enhanced lift characteristics.

Each one of said first, second or third accessory may comprise a suitable interface for enabling attaching the accessory to said at least portion of said wing surface. At least one of said first, second or third accessory may be configured for being reversibly attached to said wing element.

The first accessory is configured for being attached to a suction surface of said wing element and configured for effectively providing said modified profile with at least a change in a suction surface profile thereof with respect to said datum profile. The first accessory may be configured for providing said wing element with high lift, mild stall performance relative to said wing element absent said accessory. The first accessory may comprise an outwardly facing accessory surface having a local curvature that may increase, and/or that may remain substantially constant, along the chord in a direction towards a trailing edge of the primary element when said accessory is attached to the wing element.

The said second accessory may comprise an outwardly facing surface having an accessory profile configured for minimizing or preventing flow into said gap of said contaminants that may be flowing along or proximate to a boundary layer over said pressure surface. The accessory profile may be further configured to enable airflow through said gap for enabling aerodynamic operation of said two element aerofoil, and further configured such that the airflow through said gap is generally consistent with providing high lift aerodynamic characteristics to said aerofoil. The second accessory, when attached to the aerofoil, may provide a modified aerofoil profile configured to ensure that at least some streamlines proximate to the modified pressure surface of said primary aerofoil element follow a path including over a suction surface of said secondary aerofoil element via said gap, while concurrently providing a trajectory to contaminants flowing proximate to the modified pressure surface of said primary aerofoil element such as to cause said contaminants to overshoot said gap. The accessory surface profile may extend outwardly along at least a portion of the chord of said primary aerofoil element with respect to the original pressure surface profile of the aerofoil. The accessory surface profile may comprise a convex curvature between a forward edge and an aft edge of the accessory; alternatively, the pressure surface profile may comprise an upstream concave portion configured for imparting a centrifugal force component to said particulate matter, and a downstream convex portion joined thereto at an inflexion point.

Alternatively, the first accessory and/or the second accessory may be configured for effectively modifying the camber and/or thickness distribution of the wing element.

The third accessory is configured for being attached to a leading edge of said wing element and is configured for effectively providing said modified profile with a change in a leading edge profile thereof with respect to said datum profile, and wherein said accessory is further configured for providing a gap with respect to a leading edge portion of said datum aerofoil profile.

According to this aspect, a method is also provided for enhancing performance of a wing element in adverse conditions, the wing element being based on a two-element aerofoil section, comprising a main primary element and a secondary element separated from said primary element via a gap, the method comprising attaching at least one fixed geometry aerofoil accessory, for example of a kit of accessories, as defined herein, to said wing element.

Optionally, the suction surface accessory may be selectively, and optionally reversibly, attached to the corresponding wing element when it is desired to provide a desired high lift, mild stall performance to the wing element. Optionally, the pressure surface accessory may be selectively, optionally reversibly, attached to the corresponding wing element when it is desired to minimize or prevent accretion of contaminants on the second element of said wing element. Optionally, the leading edge accessory may be selectively, optionally reversibly, attached to the corresponding wing element when it is desired to provide a desired high lift performance to the wing element.

By convex, or generally convex, is meant that a surface bulges in a generally outward direction, though the shape of the surface is not necessarily cylindrical, and thus the terms convex or generally convex include any surface in which the rate of change of slope of the surface is generally reducing towards the peak of the surface. Conversely, by concave, or generally concave, is meant that a surface bulges in a generally inward direction, or that a surface bulges in an outward direction but in a manner in which the rate of change of slope of the surface is generally increasing towards the peak of the surface, though the shape of the surface is not necessarily cylindrical. Thus, when referring to a surface or a cross-section of a surface, the terms convex or generally convex are herein also taken to refer to a profile of the surface or cross-section of the surface wherein normals to the profile along consecutive or adjacent points on the profile generally diverge from one another, while the terms concave or generally concave are herein also taken to refer to a profile of the surface or cross-section of the surface wherein normals to the profile along consecutive or adjacent points on the profile generally converge towards one another.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

Figure 1:
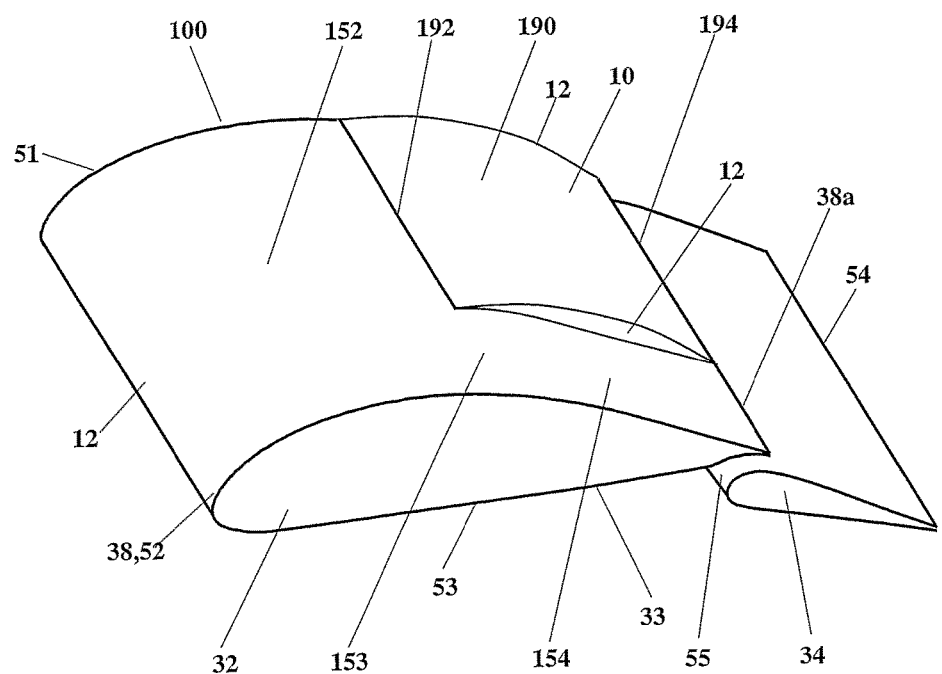
FIG. 1 is an isometric view of a wing element comprising an accessory according to a first embodiment of the invention.

According to a first embodiment of the invention, and referring to FIG. 1, an aerofoil accessory generally designated 10, is provided for two-element high lift, permanently slotted wings of an aircraft, in particular fixed wing aircraft. According to this embodiment, the accessory 10 is in the form of a "mild stall ramp" or "MS ramp", that is configured for modifying the geometric profile of a datum two element slotted aerofoil section when attached thereto to provide mild stall characteristics to the datum two-element slotted aerofoil. Mild stall slotted aerofoils integrally incorporating an MS ramp design are disclosed in copending application US2007/0278354 assigned to the present assignee, the contents of which are incorporated in full herein.

For the purpose of example, such an aircraft is described herein as a fixed-wing aircraft, comprising a regular subsonic/transonic configuration, having a fuselage section, main wings, empennage (e.g., tailplane, vertical stabilizer), and a propulsion system, but may instead include, *mutatis mutandis*, any other type of aircraft, for example: rotor-wing aircraft including helicopters; gliders; subsonic/transonic aircraft having canards rather than a tailplane; general aviation aircraft, cruise missiles or other air-delivered ordinance, and so on.

Referring again to FIG. 1, and by way of non-limiting example, a wing element 100 of a wing is illustrated, the wing having for example a substantially rectangular plan shape. The wing element 100 may comprise a portion of the span of the wing, or the full span of the wing (port or starboard) of the aircraft. The leading edge 52 of the wing element 100 is substantially rectilinear and has a substantially zero sweep angle. The wing element 100 is illustrated having a taper of about 1.0, between the two lateral ends thereof, referred to as the root 51 and the tip 53. The trailing edge 54 of the wing element 100 is also substantially rectilinear and comprises a substantially zero sweep angle. In alternative variations of this embodiment, the wing element 100 may have a different plan form, for example: swept-back or swept forward, and/or with a different taper ratio (along the full wing, or different taper ratios for different wing elements); and/or having a different plan form, including curved leading edges and/or trailing edges such as an elliptical form, for example; and/or at least some portion of the wing may have a positive, negative or zero dihedral angle; and so on.

Figure 2:
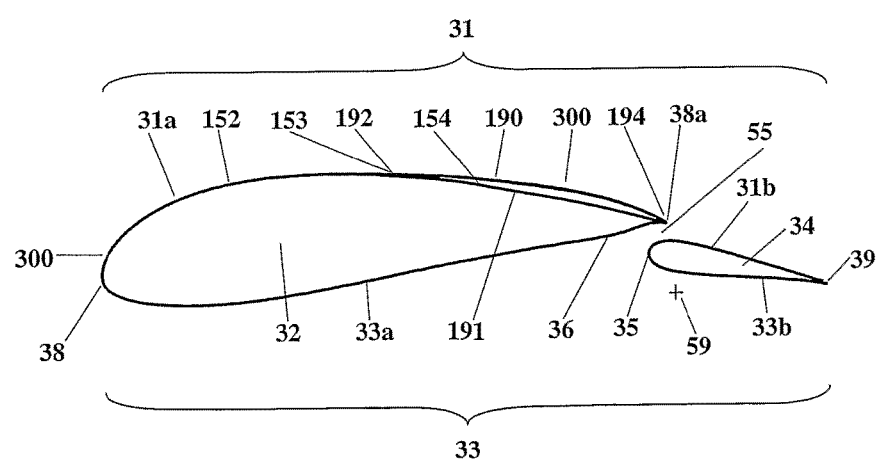
FIG. 2 illustrates a datum aerofoil section on which the wing element of FIG. 1 is based.

Referring also to FIG. 2, the wing element 100 is based on a datum two-element slotted aerofoil 300, having a substantially static primary element 32 and an optionally pivotable secondary element 34. The primary element 32 comprises the leading edge 38 of the aerofoil, which coincides with the leading edge 52 of the wing element 100, and major portions 31a, 33a, of the suction surface 31 and pressure surface 33 thereof, respectively, and a trailing end 38a. The secondary element 34 comprises the trailing edge 39 of the aerofoil, which coincides with the trailing edge 54 of the wing 10, and minor portions 31b, 33b, of the suction surface 31 and pressure surface 33 thereof, respectively. A slot 55 separates the leading portion 35 of the secondary element 34 from the trailing portion 36 of the primary element 32. For example, the slot 55 may have a width at least 1% of the aerofoil chord in a non-deflected position of the flap element, though the precise form and width size of the slot 55 generally depends on the particular mode of operation or other design consideration of the wing element. Optionally, the hinge point 59 of the secondary element 34 is outwardly displaced with respect to the lower (pressure) surface of the secondary element 34. A suitable actuation mechanism (not shown) may optionally be provided for actuating the secondary element 34 to adopt the range of deflection angles desired. Additionally or alternatively, the secondary element 34 may be spatially and/or rotationally fixed with respect to the primary element 32, and further optionally, the secondary element 34 may comprise control surfaces such as ailerons, flaps and so on, that are pivotable with respect to the secondary element 34.

The major portion 31a of the suction surface 31 may be divided into two zones, an upstream surface 152 and a downstream surface 154, meeting at transition 153, as will become clearer herein.

By way of non-limiting example, the datum aerofoil 300 comprises an 18% thickness ratio, and has $Re_{design}=1.0*10^6$, though clearly the datum aerofoil may comprise other characteristics, mutatis mutandis.

Figure 4A:
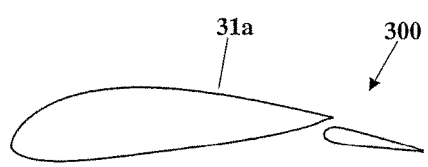
FIGS. 4(a) and 4(b) schematically illustrate, respectively, a datum aerofoil re the embodiment of FIG. 1, and a curvature distribution of a portion of the suction surface thereof.
Figure 4B:
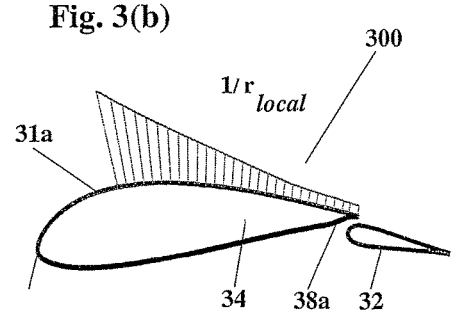

The curvature of datum aerofoil 300 is also illustrated in FIG. 4(a) and FIG. 4(b), and illustrates by way of example the profile of the local curvature along the major portion 31a of the primary element 32 that decreases with distance along the chord from the leading edge 38 to the trailing portion 38a.

Accessory 10 is configured for being attached to a portion of suction surface 31 of wing element 100, and comprises an outer surface 190 in the form of said MS ramp, a forward edge 192 and aft edge 194. The accessory 100 may laterally extend the full span of the wing element 100, or alternatively part thereof. In the illustrated embodiment of FIG. 1, the accessory extends from root 51 of the wing element 100 (closest to the aircraft fuselage) to close to the tip 53 (furthest from the aircraft fuselage) thereof, and comprises lateral sides 12. The accessory 10 is configured for being attached to the major portion 31a of the suction surface 31, i.e., on the primary element 32, such as to effectively replace downstream portion 154 with outer surface 190, to provide the aerofoil 300 with a modified profile 300' which includes outer surface 190.

Figure 3A:
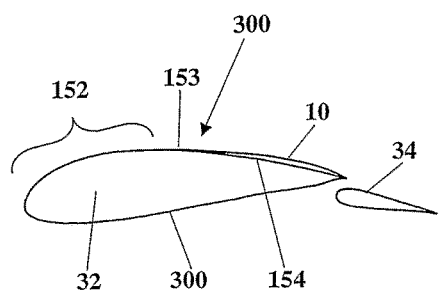
FIGS. 3(a) and 3(b) schematically illustrate, respectively, a modified aerofoil profile obtained for the two-element aerofoil embodiment of FIG. 1, and a curvature distribution of a portion of the suction surface of the two-element aerofoil embodiment.
Figure 3B:
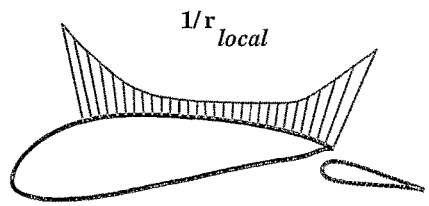

Outer surface 190 comprises a local curvature ($1/r_{local}$) that may increase, and/or that may remain substantially constant, i.e., the local curvature does not substantially decrease, along the chord from the forward edge 192, or a position downstream thereof, to the aft edge 194. In this embodiment, the accessory 10 is positioned over downstream portion 154, such that the forward edge 192 is at or near to the transition 153. Thus, the surface 190 is downstream of upstream portion 152 of suction surface 31a, in which the local curvature is reducing along the chord length (see FIG. 3(a) and FIG. 3(b), for example). As is also evident from FIG. 3(b), the rate of change of curvature along the suction surface 31 from the leading edge 38 to trailing portion 38a in the modified profile 300' may be positive in some variations of this embodiment, or zero in other variations of this embodiment.

Optionally, the transition 153 on the suction surface 31a may be located along the chord at a location in which the local curvature stops decreasing in the modified profile 300', i.e., the transition between portions 152 and 154, may be located approximately after the point of laminar-turbulent transition i.e., transition in laminar separation bubble, when the surface 154 is replaced with surface 190. In any case, point 153 may be, by way of example, at about 30%, 40%, 45%, or 50%, or at any point between about 30% and about 50%, or greater than 50% of the local chord (i.e., the chord of the primary element 32). Further optionally, the local curvature of surface 190 may be constant or increasing up to about 80%, 90%, 95% or more of the local chord.

The profile of the outer surface 190 may be determined in any suitable manner. For example, given the profile of the datum aerofoil 300, the modified profile 300' of the aerofoil, incorporating the MS ramp, may be designed for example as disclosed in US2007/0278354, such as to provide the desired local curvature distribution over the suction surface 31a. The modified profile 300' may provide the modified aerofoil with a coefficient of lift distribution $C_l$ with respect to angle of attack such that a stall plateau is maintained for an angle of attack range of at least 5 degrees where the $C_l$ is within up to about 5% of maximum $C_l$.

Such a design of the modified aerofoil profile 300' may result in a pressure coefficient ($C_p$) distribution with respect to chord including an inflexion point in the distribution, which may be present from pre-stall angles of attack up to high post stall angles of attack.

Optionally, the surface 190 may have a geometry that is dependent on the design Reynolds number for the aerofoil. For example, the higher the design Reynolds number, the larger the local curvature of the surface 190, and conversely, the lower the design Reynolds number, the lower the local curvature of the surface 190. It is to be noted that the larger curvature surface 190 that may be provided for a high design Reynolds number, also results in mild stall when the flow conditions are consistent with low Reynolds number, but at an additional drag penalty. By way of example, the design Reynolds number for a two element aerofoil may be between about $0.3*10^6$ to about $1.0*10^6$.

Thus, the accessory 10 serves to effectively expand outwardly the geometric profile of the datum aerofoil 300, or at least a part thereof, particularly along the suction surface thereof. According to one aspect of the invention, the accessory 10 is ultimately used with an existing datum aerofoil design without actually changing the form of the datum aerofoil itself, i.e. without physically altering the original wing element 100 itself. Accordingly, the design of modified profile 300' does not include portions of the profile 300' that, as a result of the modification, are now inwardly recessed with respect to an envelope defined by the datum aerofoil profile. According to another aspect of the invention, the accessory 10 may be used with an existing datum aerofoil design that may also be adjustable per se, and may enable actually changing the form of the datum aerofoil itself, i.e. physically altering the wing element 100 itself. For example, in other embodiments of the invention, it may be possible to structurally change the wing element to enable the design of modified profile to include portions of the profile that, as a result of the modification, may now be inwardly recessed with respect to the datum aerofoil profile 300.

Referring again to FIG. 1, once the modified profile 300' is determined, the minimum chordwise extent of the profile of the outer surface 190 may be obtained by essentially geometrically subtracting the profile of the datum aerofoil from the profile of the modified aerofoil, i.e., by removing from the modified profile all geometric elements common with the datum aerofoil 300, which may include the secondary element 34, the pressure surface 33a, trailing end 38a, leading edge 38 and upstream portion 152. The remaining geometric portion then defines the profile of outer surface 190 of the accessory 10. The inner facing side 191 of the accessory 10 is defined within an inner envelope provided by downstream surface 154, since the accessory 10 is mated to this surface, such that the aft end 194 is at or close to the trailing end 38a, and the forward edge 192 is at or near to the transition 153.

In cases where the modified profile 300' also comprises other portions thereof which are outwardly extending with respect to corresponding parts of the datum aerofoil profile, additional accessories comprising the corresponding required profile may be provided for such portions in a similar manner to accessory 10, mutatis mutandis.

The accessory 10 may be constructed as a substantially solid or hollow item, made from any suitable materials, for example a lightweight material such as polystyrene foam, plastic, wood, composites, or a suitable metal, for example. Further optionally, the accessory 10 may be formed from a material having substantially uniform density along the chord and/or span directions.

Figure 5A:
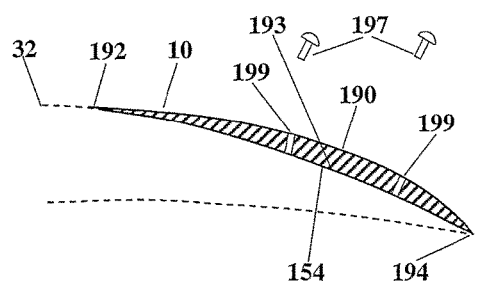
FIGS. 5(a), 5(b) and 5(c) illustrate in cross-sectional side view examples of accessory construction and the manner of its attachment to a wing element, associated with the embodiment of FIG. 1.
Figure 5B:
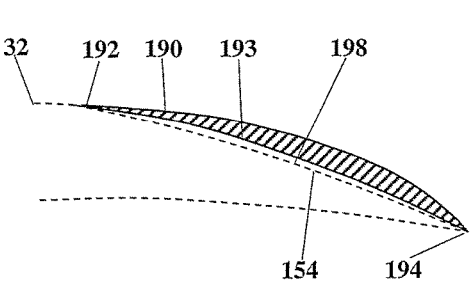
Figure 5C:
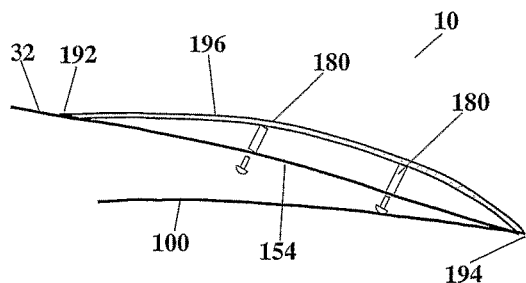

For example, and referring to FIGS. 5(a) to 5(c), the accessory 10 may comprise a substantially solid construction, having a lower surface 193 substantially complementary to the surface 154 of the unmodified aerofoil 300, meeting the outer surface 190 at the forward edge 192 and aft edge 194 in the chord direction. Referring to FIG. 5(a), the accessory may be attached to the surface 154 by means of a suitable adhesive, or alternatively by means of bolts, screws or the like, for example, and may comprise a plurality of through-holes 199 for providing access through the accessory 10 to the wing element 100 for bolts 197 or the like. Optionally, and particularly where an adhesive is used for attaching the accessory to the wing element 100, the lower surface 193 may be recessed from the envelope 190' defined by an imaginary surface complementary to the surface 154, defining a gap 198 at least sufficiently large for allowing room for the adhesive, for example as illustrated in FIG. 5(b). Alternatively, and referring to FIG. 5(c), particularly in variations of this embodiment where the accessory comprises a substantially hollow construction, the accessory 10 comprises an outward facing plate element 196 comprising said outer surface 190, including a plurality of inner bosses 180 or the like, which may be configured for receiving and engaging bolts, rivets, crews or the like, via the wing element 100.

In operation, the accessory 10 may be attached to the wing element 100 whenever it is desired that the wing element 300 be modified to have said modified profile 300'. Such an attachment may be conducted at the factory where the wing element 100 is manufactured, or as a retrofit operation conducted by suitable ground crews when the aircraft is not airborne. The attachment of the accessory 10 may be temporary, the accessory being removed when it is desired for the wing element 100 to revert back to the profile of the original datum aerofoil 300. Alternatively, attachment of the accessory 10 may be permanent, whenever there is a requirement to permanently provide the wing element with the performance changes resulting from the installation of the accessory.

While the accessory for the first embodiment has been described as having an outer surface 190 defined by and limited by the contour of the MS ramp, this is not necessarily so for other alternative variations of this embodiment. For example, the accessory may also comprise an upstream portion that is configured for being attached to and is substantially similar in profile to a part or all of the upstream surface 152, optionally including the leading edge 38, optionally including the pressure surface 33a, and optionally including the trailing end 38a. Thus, for example, the accessory may comprise one or more band elements (not shown), having a with in the span direction that is less than or equal to, and in other case greater than, the span of the accessory 10, that loop around the wing element 100, keeping the accessory in place over surface 154. In such cases, the auxiliary portions or band elements may be of relatively small thickness in order not to deviate significantly from the profile of the datum aerofoil.

While in other variations of the first embodiment, the accessory provides a modified aerofoil profile to wing section over a part of or all of the suction surface 31 as desired, mutatis mutandis, for providing any desired change in performance of the wing section, the accessory 10 is generally configured for providing smooth stall characteristics for both laminar and turbulent wings, when installed thereon, and the geometrical dimensions of the accessory 10 are generally to be minimized while providing such a performance.

Figure 6:
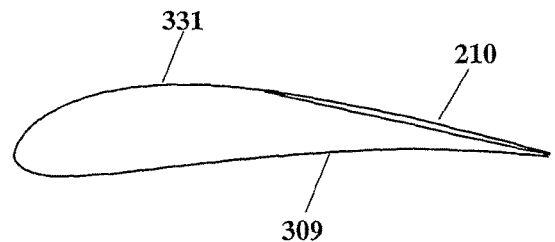
FIG. 6 is a side view of a wing element comprising an accessory according to a variation of the first embodiment of the invention.

Referring to FIG. 6, a variation of the first embodiment of the invention is illustrated, comprising an accessory 210 substantially similar to accessory 10 of the first embodiment and variations thereof, mutatis mutandis. However, in this variation of the first embodiment, the accessory 210 is configured for being attached to a single element aerofoil 309, to modify the profile of the suction surface 331 thereof, in particular a downstream position thereof, mutatis mutandis. For example, the suction surface profile of the single aerofoil 309 may be effectively projected outwardly by means of the accessory 210 to provide a higher thickness to chord ratio than for the datum aerofoil 309, and/or to modify the camber distribution thereof.

Figure 7:
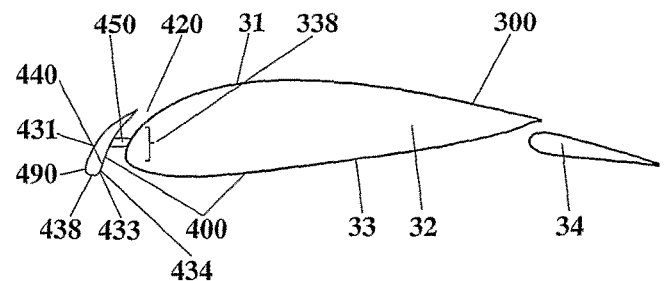
FIG. 7 is a side view of a wing element comprising an accessory according to a second embodiment of the invention.

According to a second embodiment of the invention, and referring to FIG. 7, an accessory is provided for modifying the effective leading edge profile and chord of datum aerofoil 300, by way of example, though the accessory may be provided for any other two-element aerofoil in a similar manner, mutatis mutandis. The accessory 410 according to this embodiment modifies the datum aerofoil profile 300 in a manner such as to provide a slot 420 close to the leading edge 438 of the modified aerofoil profile 400. Clearly, in variations of this embodiment, the leading edge accessory may be applied also to single-element aerofoils as well, mutatis mutandis.

Accordingly, the accessory 410 provides an external surface 490 that effectively replaces a leading edge portion 338 of the datum aerofoil profile 300, including the leading edge 38, an upstream portion of the pressure surface 33, and an upstream portion of the suction surface 31 of the datum aerofoil 300. The accessory 410 thus provides a new leading edge 438, plus suction surface auxiliary portion 431 and pressure surface auxiliary portion 433, when the accessory 410 is attached to the datum aerofoil 300. The accessory 410 is forwardly displaced from the aerofoil profile 300 by means of struts 450 or the like to form slot 420, which is defined by the leading edge portion 338 of the datum aerofoil profile 300 on the one hand, and an aft-facing surface 440 of the accessory 410, on the other hand.

The pressure surface 433 may have a rounded aft portion 434 that blends into the aft-facing surface 440 so as to facilitate flow into the slot 420 of a portion of the airflow flowing along the pressure surface 433. Injection of this flow to the suction surface 331 of the datum aerofoil can provide enhanced lift characteristics which can be useful in take-off and landing in adverse conditions, including when the aircraft is carrying a heavy payload. As such conditions are not always present, and there is a drag penalty attached to the incorporation of the accessory 410, this may be removed by the ground crew when not required for a future mission, as with other embodiments of the invention, mutatis mutandis.

Optionally, the profile of the accessory 410 may be such that the leading edge 438 provided by the accessory 410 is relatively lower than leading edge 38 of the datum aerofoil 300 with respect to the datum aerofoil chord.

The struts 450 may be configured for enabling reversible attachment of the accessory 410 to the wing element 100. Alternatively, the accessory may comprise alternative arrangements for enabling attachment to the aerofoil, such as to provide the slot 420, for example as disclosed for the first embodiment, *mutatis mutandis*.

As with other embodiments of the invention, the outer profile of the surface 490 of the accessory 410 may be generated, starting with the profile of the datum aerofoil 300, and modifying this profile so as to provide the required modified aerofoil profile with the desired change in chord and incorporation of the slot, and then effectively removing from the modified profile all geometric elements common with the datum aerofoil 300. Optionally, the accessory 410 may also include a leading edge radius that may be either larger than, smaller than, or substantially the same as the leading edge radius of the datum aerofoil 300.

Figure 8:
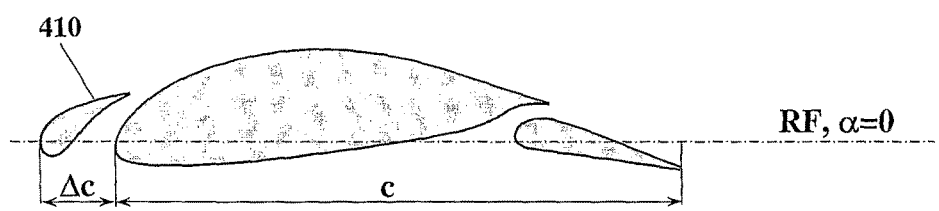
FIG. 8(a) illustrates in cross-sectional side view an accessory according to a variation of the second embodiment of the invention.
FIG. 8(b) illustrates detail of the accessory of FIG. 8(a).
Figure 8:
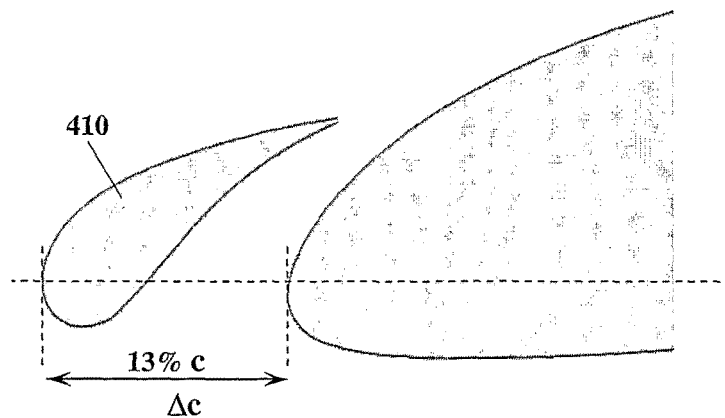
Figure 10:
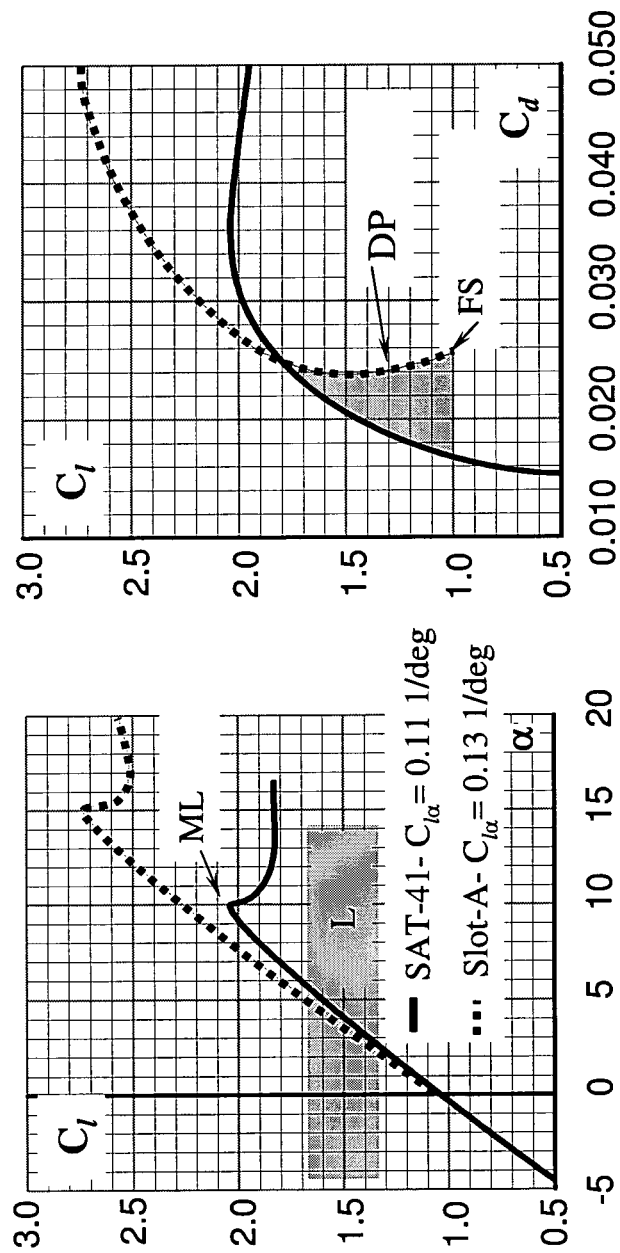
FIGS. 10(a) and 10(b) illustrate computer generated comparative results, using MSES code with turbulent flow over the aerofoil section at Reynolds numbers of about $10^6$ and a flap deflection of zero for the secondary element of the datum aerofoil obtained with the embodiment of FIGS. 8(a) and 8(b).

A feature of accessory 410 is that the removable leading-edge slot provides a capability to improve significantly maximum lift of single and two-element airfoils. This is especially relevant for the high-lift flight of heavy weight configurations in difficult weather conditions (heavy rain, for example), where improvement of maximum lift of turbulent airfoils makes it possible to continue the mission of high-lift loitering flight. Referring to FIGS. 8(*a*) and 8(*b*), an application of the second embodiment is illustrated, with respect to an aerofoil section of the Heron UAV, in which the leading edge accessory, marked 410', effectively increases the chord of the aerofoil section by Δc of about 13% of the original chord c, and a reference plane is marked RF. FIGS. 10(*a*) and 10(*b*) illustrate computer generated comparative results, using MSES code with turbulent flow over the aerofoil section at Reynolds numbers of about $10^6$ and a flap deflection of zero for the secondary element of the datum aerofoil. FIG. 10(*a*) illustrates that the modified aerofoil with the accessory 410' provides comparatively improved lift performance with respect to the datum aerofoil as a function of angle of attack α, but with an increased drag penalty and possible flow separation (marked at DP and FS, respectively, in FIG. 10(*b*)) associated with lower lift coefficients. Such drag penalties at small lift coefficients may be recovered by operating the wing with negative flap deflections (effectively decambering the wing) at increased angles of attack for the wing. In FIG. 10(*a*), the shaded area L is associated with loitering, and ML indicates insufficient maximum lift.

According to a third embodiment of the invention, and referring to FIGS. 9(*a*) to 9(*c*), an accessory is provided for modifying at least part of the pressure surface profile of datum aerofoil 300, by way of example, though the accessory may be provided for any other two-element aerofoil in a similar manner, *mutatis mutandis*. Accessory 510 according to this embodiment modifies the datum aerofoil profile 300 in a manner such as to outwardly project at least a portion of the pressure surface 533 of the datum aerofoil 300. Accordingly, the accessory 510 provides an external surface 590 that effectively replaces at least a portion of the pressure surface 533, of the datum aerofoil 300. In this embodiment, this portion is a downstream portion of the pressure surface 533 (FIG. 9(*c*)), though in various alternative variations of this embodiment, this portion may be substantially the full pressure surface 533 (FIG. 9(*a*)), an upstream portion thereof (FIG. 9(*b*)) or indeed any intermediate portion or portions of the pressure surface 533. The accessory 510 comprises a first edge 591 and second edge 592, which substantially define the chord-wise ends of the accessory. Furthermore, the accessory comprises suitable arrangements for enabling attachment to the aerofoil, which may be similar to the corresponding arrangements as disclosed for the other embodiments disclosed herein, mutatis mutandis. Design and the construction of the accessory 510 may be similar to that described herein for other embodiments of the invention, mutatis mutandis, the main difference being in the particular manner in which it is desired to modify the profile of the datum aerofoil 300 to achieve a desired change in performance associated with the modified aerofoil.

In one particular application of the third embodiment the accessory 510 provides a shielding effect with respect to the second element 34 of the two element aerofoil so as to prevent or minimize accretion of contaminants such as for example snow or ice on the second element 34, particularly on the leading edge thereof. In the embodiment of FIG. 9(*c*), the pressure surface of the primary element 32 extends outwardly with respect to the pressure surface profile of aerofoil 300. It is apparent that in this embodiment the thickness t of the primary element 32 together with accessory 510 just upstream of the gap 55 is greater than and overlaps the maximum thickness of the secondary element 34, as seen along the general flow direction F, and thus the secondary element 34 is not outwardly displaced with respect to the lower (pressure) surface of the secondary element 34 in a direction generally orthogonal to direction F, for angles of attack α of 0 degrees or greater. The profile of pressure surface of the accessory 510 comprises an outwardly extending or generally convex curvature, with respect to the corresponding profile of the aerofoil baseline pressure, along at least a downstream portion of the aerofoil pressure surface, this portion being intermediate between the leading edge 38 and a trailing end 38*a* of the primary aerofoil element 32. In this embodiment, the profile of the pressure surface of the accessory 510 begins at a point A downstream of the leading edge 38, smoothly departs from the aerofoil pressure surface and peaks at point B, and returns to the aerofoil pressure surface profile at point C proximate to the trailing end 38*a*. The additional thickness Δt of the pressure surface of the accessory with respect to aerofoil pressure surface profile thus increases smoothly from nominally zero at A to a maximum at B and back to nominally zero again at C smoothly, providing a generally convex surface.

Figure 12:
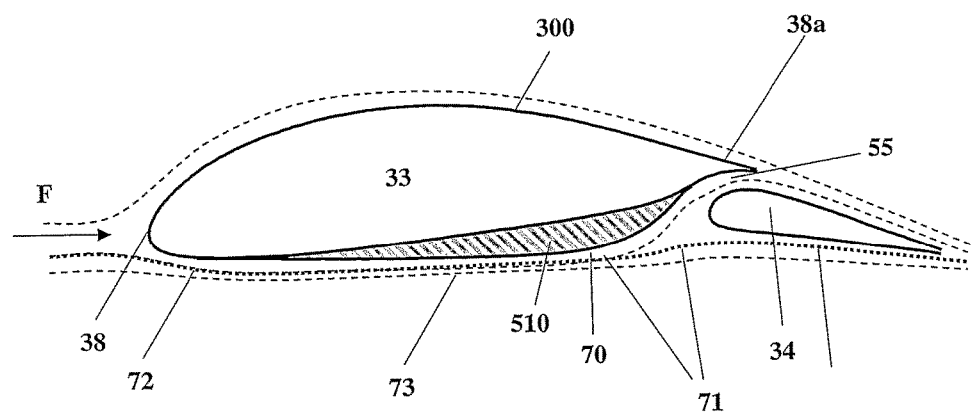
FIG. 12 schematically illustrates operation of the embodiment of FIG. 9(c) in the presence of particular contaminants in the airflow.

In particular, and referring also to FIG. 12, the modified profile of aerofoil 300, with the accessory 510 mounted thereto, is such as to ensure that the airflow over the aerofoil is still maintained—i.e., the flow represented by some streamlines proximate to the pressure surface of the primary aerofoil element 32 follow a path close to the pressure surface 33*a*, some streamlines 72 close to the pressure surface passing over the accessory 510 and through gap 55, and proceeding over the suction surface of said secondary aerofoil element 34, thereby avoiding separation of the flow with respect to the pressure surface and gap 55, while other streamlines 73 further outboard pass over the pressure surface of the secondary element 34. At the same time, the profile or form of the exposed, pressure surface of accessory 510 is such as to concurrently provide a trajectory 71 to particulate matter p flowing proximate to the pressure surface, for example along streamline 72, such as to cause said particulate matter to overshoot the gap 55 and flow over the pressure surface of the secondary element 34. This configuration for the aerofoil 300 with the accessory 510, enables the composite aerofoil to continue to operate as a two-element aerofoil, in a similar manner to the original aerofoil 300 (possibly with less performance), but at the same time avoids entrainment of particulate matter p towards the gap 55, and therefore minimizes the possibility or degree of impact and accretion of such matter on the leading edge 35 of the secondary element 34.

Referring in particular to FIG. 12, the streamline 72 and particle trajectory 71 follow different paths at a particular region 70, in which there is a gradual deviation of water droplet or other particulate matter trajectories from the general airflow direction, on the pressure surface, and, without being bound to theory, may utilize the different inertial properties of air and of the particulate matter p, for example in the form of water droplets, snow or ice fragments, etc. This region 70 may be characterized in providing a change in the flow direction that is too sharp to be negotiated by the particulate matter p, while providing a positive pressure gradient, or at least a sufficiently mild adverse pressure gradient that would not cause the corresponding airflow to become detached from the pressure surface and to flow directly to the pressure surface of the secondary element 34, rather than to flow through gap 55.

Figure 9A:
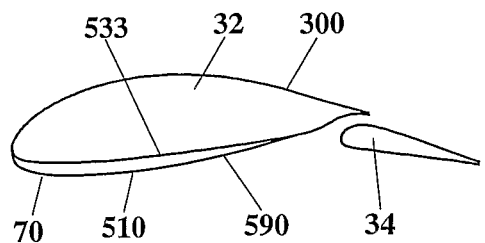
FIGS. 9(a), 9(b) and 9(c) illustrate in cross-sectional side view an accessory according to a third embodiment of the invention, and variations thereof.
Figure 9B:
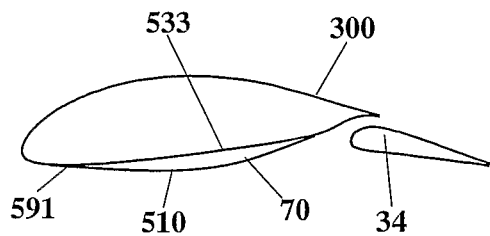

In alternative variations of this embodiment, and as illustrated in FIG. 9(a) and FIG. 9(b), the profile of outer pressure surface of the accessory 510 may comprise an outwardly extending convex curvature, with respect to the pressure profile of the of aerofoil 300; in FIG. 9(a) the accessory 510 assumes a generally upstream position, and is profiled accordingly, and in FIG. 9(b) the accessory assumes a generally intermediate position, and is profiled accordingly. In the embodiment of FIG. 9(a), and more so with the embodiment of FIG. 9(b), mutatis mutandis, the corresponding deviation point or region, 70' and 70", respectively, is further upstream with respect to the leading edge 38 than in the embodiment of FIG. 12.

Accessory 510 may be designed by first designing an imaginary aerofoil based on aerofoil 300, but integrally incorporating the outer pressure profile of accessory 510 (when mounted thereto), and then the profile of the aerofoil 300 is geometrically subtracted from the profile of the imaginary aerofoil to arrive at the profile of the accessory 510.

Given a particular design for aerofoil 300, a number of iteration loops may be conducted, in which for each loop, the profile of the pressure surface of the imaginary aerofoil is extended in at outward direction by a predefined increment, and for example this may take the form of a percentage of the thickness of the main element 32, at a particular position—point B or close to a candidate point or region 70—the extension of the surface decreasing on either side of this point towards points A and C of the accessory 510 in a generally smooth manner. The performance of the modified imaginary aerofoil is then estimated using known methods—for example CFD programs, wind tunnel testing and so on. The trajectory of particulate matter flowing close to the pressure surface of the imaginary aerofoil is also calculated, using for example two-phase flow (e.g., air and water droplets) CFD programs having an inertia option for the flow. If the performance of the modified aerofoil and/or the trajectory of the particulate matter p is not acceptable, the aerofoil profile is again changed, for example by changing one or more of the amount of the projection, the location of the maximum projection and the profile of the pressure surface between point B and points A and C. The trial and error approach may be continued until a suitable compromise between aerofoil performance and particulate trajectory is achieved.

Furthermore, the above iteration procedure may be repeated for a range of angles of attack of the aerofoil, wherein small or negative angles of attack may provide the desired effect in particulate trajectory, though at a performance penalty compared with higher angles of attack.

The possibility of flow separation at the slot region is a factor that additionally may be analyzed and corrected if necessary at each design iteration. In general, at small lift coefficients there is a conflict between the requirement to avoid ice accretion on secondary element, which may be configured for operating as flaps and/or ailerons, for example, and the desirability to minimize drag penalties due to flow separation and resulting limitation on maximum speed flight. On the other hand, at high lift coefficients, due to angle of attack effect, the second element is more exposed, relatively speaking, to the airflow carrying particulate matter, such as water droplets etc., for example, and at least according to one aspect of the invention this may be considered as a baseline case for ice accretion on the secondary element, and most of iterative design efforts may correspondingly be directed to such a case. In the high lift case, flow separation at the slot region is generally highly unlikely because of favorable accelerating pressure gradient.

Figure 9C:
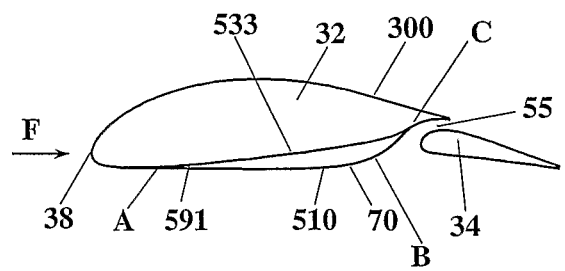
Figure 13:
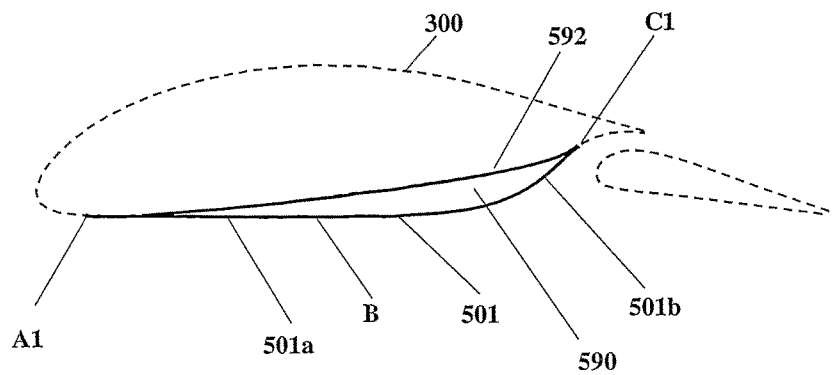
FIG. 13 illustrates in cross-sectional side view a variation of the embodiment of FIG. 9(c).
Figure 14:
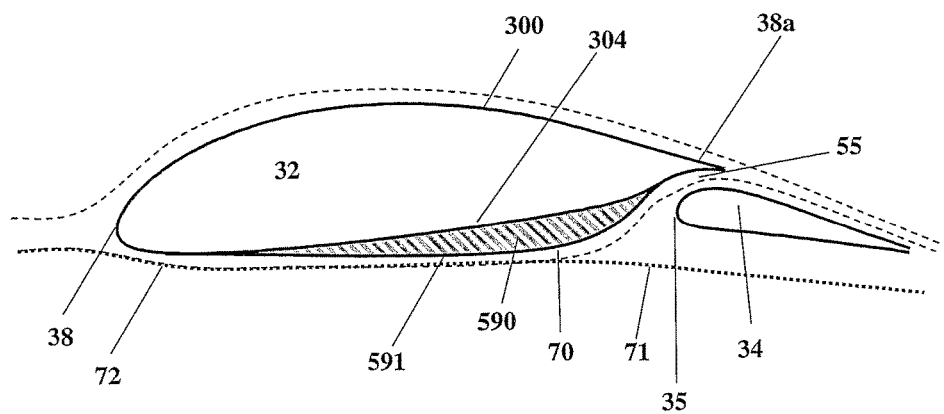
FIG. 14 schematically illustrates operation of the embodiment of FIG. 13 in the presence of particular contaminants in the airflow.

Referring to FIG. 13 and FIG. 14, a variation of the embodiment of FIG. 9(c) is illustrated, and comprises all the elements as disclosed for the embodiment of FIG. 9(c), mutatis mutandis, the main difference being that in this variation of the embodiment, the accessory 590 is configured for providing a stronger shielding effect to the second element of the aerofoil 300 than with the embodiment of FIG. 9(c).

The profile of pressure surface 591 of the accessory 590 also comprises an outwardly extending curvature, with respect to the corresponding profile of the aerofoil pressure surface profile, and effectively replaces a downstream portion 304 of the aerofoil pressure surface, intermediate between the leading edge 38 and a trailing end 38a of the primary aerofoil element 32. The accessory 590 comprises a leading edge represented by point A', which when the accessory 590 is mounted to the aerofoil 300 is downstream of the leading edge 38, and a trailing edge represented by point C' that is proximate to the trailing end 38a. However, in this embodiment, the surface 591 comprises an upstream generally concave portion 591a that smoothly dovetails into a downstream generally convex portion 591b at point of inflexion B'. The concave portion 591a is configured for imparting a centrifugal acceleration to particulate matter p, such as for example water droplets carried by the airstream, for example as represented by streamline 72, thus directing the particulate matter p in a trajectory 71' away from the second element 34. On the other hand, the convex portion 591b is configured for turning the airflow (for example streamline 72) towards the slot 55, but presents too steep a turn for the particulate matter p, due to the inertial properties thereof which are different from the inertial properties of air, and thus overshoot past the stagnation point 35' of the secondary element 34, and away from the pressure surface of the secondary element 34.

The accessory 590 also comprises a contact surface 592 that is conformal with, i.e. complementary to the portion 304, and enables the accessory to be seated onto the aerofoil 300 (i.e., to a wing element based on the aerofoil) when attached thereto, and any suitable attachment arrangement may be used for affixing the accessory. In alternative variations of the embodiment, the accessory may be configured in a different manner for attachment to the aerofoil based wing element, for example as disclosed above for the embodiment of FIGS. 5(a), 5(b), and 5(c), mutatis mutandis.

Figure 11A:
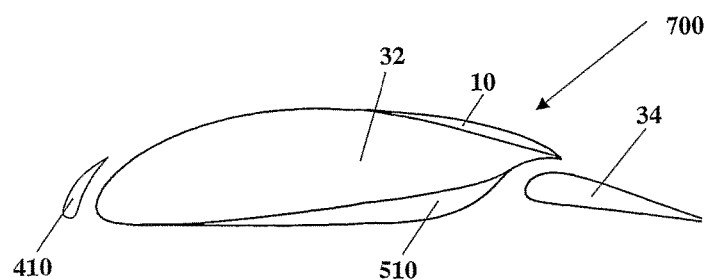
FIG. 11(a) and FIG. 11(b) illustrate in cross-sectional side view a kit comprising accessories mounted to the aerofoil, and unmounted with respect thereto, respectively.
Figure 11B:
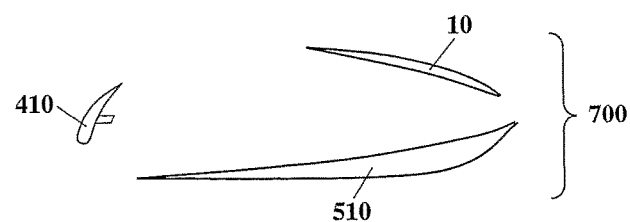

In yet another variation of the third embodiment, the pressure surface accessory is designed to provide the aerofoil with a greater thickness to chord ratio. According to another aspect of the invention, and referring to FIG. 11(a)

and FIG. 11(b), a kit 700 and corresponding retrofit method are provided for enhancing or otherwise modifying the performance of wings, based on datum aerofoil 300, by way of example, (though the accessory may be provided for any other two-element aerofoil in a similar manner, *mutatis mutandis*) in adverse conditions. In other words, the kit 700 is provided for improving baseline aerodynamic characteristics of a wing based on an aerofoil (e.g. aerofoil 300) at off-design conditions, by enabling installation of the kit 700 prior to flying the aircraft that comprises the wings. Such adverse conditions may comprise, by way of non-limiting example, any one of extreme weather; snow/ice/rain/water droplets/dust particles/smoke particles/sand and/or other contaminants present in the airflow; high wind turbulence; high altitude and/or high weight take-off and landing; turbulent wing flow, and so on. According to this aspect of the invention, and referring to FIG. 11(a) and FIG. 11(b), a kit 700 comprising one, two or three accessories for a wing is provided for modifying the profile of a datum aerofoil 300, a two-element aerofoil, such as to enhance the performance thereof or to at least to prevent or minimize deterioration in performance thereof, under said adverse conditions. The accessories may comprise one or more of the accessories 10, 410 and 510, for example, as disclosed herein, *mutatis mutandis*. Each accessory is fixedly attached to the wing, and modifies the geometry of the wing in a fixed manner, and correspondingly modifies the performance of the wing, until the accessory is removed. Some features of at least some embodiments of such accessories may include one or more of the following: the accessories enable the geometry of the wing to be altered in a simple, cost effective manner; the accessories are readily retrofittable on existing wing designs; a number of different accessories may be provided for a particular wing design, and a particular set of accessories may be chosen for each particular mission to optimize the performance of the aircraft for that particular mission.

Thus, according to this aspect of the invention, the kit includes a set of one, two or three accessories chosen from accessories 10, 410, 510, provided for each wing of an aircraft, such as for example a UAV (though this aspect of the invention is also applicable, mutatis mutandis to manned aircraft as well), the wings of which are based on two element aerofoil 300, by way of example, though the accessories may be provided for wings based on any other two-element aerofoil in a similar manner, *mutatis mutandis*. Depending on the particular mission and conditions for the aircraft, one or more of the accessories may be removably affixed onto the aircraft wings as required or desired, prior to operating the aircraft.

In one example, the aforementioned aircraft is to operate with unusually heavy payloads, and thus leading edge accessory 410 may be attached to the wings via struts 450 to provide increased lift performance. Additionally or alternatively, it may be desired to operate the aircraft in adverse atmospheric conditions, including snow or ice, in which additionally or alternatively, respectively, pressure surface accessory 510 is attached to the pressure surface of each of the wings to shield the secondary element 34 and prevent or minimize accretion of snow or ice thereon. Additionally or alternatively, it may be desired to operate the aircraft at low forward speed and high lift, including high angles of attack, in which additionally or alternatively, respectively, suction surface accessory 10 is attached to the suction surface of each of the wings to provide high lift, mild stall characteristics, enabling flying the aircraft at post-stall conditions. The kit 700 thus enables modifications to the aircraft wings, to be performed in a simple, fast and cost effective manner, to enhance utility and survivability of the aircraft in situations where the original wing design may not provide the desired or necessary performance.

In the method claims that follow, alphanumeric characters and Roman numerals used to designate claim steps are provided for convenience only and do not imply any particular order of performing the steps.

Finally, it should be noted that the word "comprising" as used throughout the appended claims is to be interpreted to mean "including but not limited to".

While there has been shown and disclosed example embodiments in accordance with the invention, it will be appreciated that many changes may be made therein without departing from the spirit of the invention.

The invention claimed is:

1. An aerofoil-aerofoil accessory assembly, comprising:
a wing element having an outer facing aerofoil surface and having wing sections in the form of at least one datum aerofoil section defining a datum profile, the wing element including a main primary element and a secondary element separated from said main primary element via a spacing; and
an aerofoil suction surface accessory being selectively and reversibly attached to the wing element and configured for providing a modified geometric profile to the at least one datum aerofoil section with respect to the datum profile when said accessory is attached to the wing element, said wing element being designed for aerodynamic flight absent said aerofoil suction surface accessory, said aerofoil suction surface accessory configured for maintaining a substantially fixed geometric profile with respect to the at least one datum aerofoil section at least whenever said wing element with said aerofoil suction surface accessory thereon is airborne, said modified geometric profile being such as to provide said wing element with said aerofoil suction surface accessory attached thereto with a desired change in performance relative to a datum performance provided by the wing element absent said aerofoil suction surface accessory, and wherein said aerofoil suction surface accessory provides said modified geometric profile in a manner that is fixed at least during flight, said aerofoil suction surface accessory comprising an outer surface outwardly curving, the outer surface being configured for providing or enhancing mild stall performance, the aerofoil suction surface accessory mounted to a suction surface of an aft section of the main primary element of the wing element.

2. The aerofoil-aerofoil accessory assembly according to claim 1, wherein said aerofoil suction surface accessory is configured for effectively providing said modified profile with at least a change in a suction surface profile thereof with respect to said datum profile.

3. The aerofoil-aerofoil accessory assembly according to claim 2, wherein said outer facing aerofoil surface comprises a local curvature that may increase, or that may remain substantially constant, along the chord in a direction towards a trailing edge of the primary element when said aerofoil suction surface accessory is attached to the wing element.

4. A method for modifying a geometry of a wing element with an aerofoil suction surface accessory, the method comprising:
providing the wing element having an outer facing aerofoil surface and having wing sections in the form of at least one datum aerofoil section defining a datum profile, the wing element including a main primary element and a secondary element separated from said main primary element via a spacing, the wing element being designed for aerodynamic flight absent said aerofoil suction surface accessory; and attaching the aerofoil suction surface accessory to a suction surface of an aft section of the main primary element of the wing element, said aerofoil suction surface accessory being selectively and reversibly attached to the wing element and configured for providing a modified geometric profile to the at least one datum aerofoil section with respect to the datum profile when said aerofoil suction surface accessory is attached to the wing element, said aerofoil suction surface accessory configured for maintaining a substantially fixed geometric profile with respect to the at least one datum aerofoil section at least whenever said wing element with said aerofoil suction surface accessory thereon is airborne, said modified geometric profile being such as to provide said wing element with said aerofoil suction surface accessory attached thereto with a desired change in performance relative to a datum performance provided by the wing element absent said aerofoil suction surface accessory, and wherein said aerofoil suction surface accessory provides said modified geometric profile in a manner that is fixed at least during flight, said aerofoil suction surface accessory including an outer surface outwardly curving, the outer surface being configured for providing or enhancing mild stall performance.

5. The method according to claim 4, wherein said aerofoil suction surface accessory is attached to the wing element when it is desired to provide a desired high lift, mild stall performance to the wing element.

6. An aerofoil-aerofoil accessory assembly, comprising:
a wing element having an outer facing aerofoil surface and having wing sections in the form of at least one datum aerofoil section defining a datum profile, the wing element including a main primary element and a secondary element separated from said main primary element via a spacing; and
an aerofoil pressure surface accessory being selectively and reversibly attached to the wing element and configured for providing a modified geometric profile to the at least one datum aerofoil section with respect to the datum profile when said accessory is attached to the wing element, the wing element being designed for aerodynamic flight absent said aerofoil pressure surface accessory, said aerofoil pressure surface accessory configured for maintaining a substantially fixed geometric profile with respect to the at least one datum aerofoil section at least whenever said wing element with said aerofoil pressure surface accessory thereon is airborne, said modified geometric profile being such as to provide said wing element with said aerofoil pressure surface accessory attached thereto with a desired change in performance relative to a datum performance provided by the wing element absent said accessory, and wherein said aerofoil pressure surface accessory provides said modified geometric profile in a manner that is fixed at least during flight, said aerofoil pressure surface accessory attached to a pressure surface of the main primary element of the aerofoil, and configured for minimizing or avoiding accretion of contaminant on said secondary element when subjected to an airflow comprising said contaminant, the contaminant being in the form of particulate matter flowing in a downstream direction with respect to a leading edge of said main primary element; and wherein said aerofoil pressure surface accessory includes a profile configured to ensure that at least some streamlines proximate to said pressure surface of said main primary element follow a path including over a suction surface of said secondary element spaced from the main primary element via said gap, while concurrently providing a trajectory to particulate matter flowing in said at least some streamlines proximate to said pressure surface of said main primary element to cause said particulate matter to overshoot said gap.

7. The aerofoil-aerofoil accessory assembly according to claim 6, wherein said aerofoil pressure surface accessory is configured for effectively providing said modified profile with at least a change in a pressure surface profile thereof with respect to said datum profile.

8. The aerofoil-aerofoil accessory assembly according to claim 7, wherein said aerofoil pressure surface accessory is configured for preventing or minimizing accretion of contaminants on said secondary element when attached to said primary element.

9. The aerofoil-aerofoil accessory assembly according to claim 8, wherein said outer facing aerofoil surface comprises an accessory profile configured for minimizing or preventing flow into said gap of said contaminants that may be flowing along or proximate to a boundary layer over said pressure surface.

10. The aerofoil-aerofoil accessory assembly according to claim 8, wherein said accessory surface profile extends outwardly along at least a portion of the chord of said primary aerofoil element with respect to the original pressure surface profile of the aerofoil.

11. The aerofoil-aerofoil accessory assembly according to claim 8, wherein said accessory surface profile comprises a convex curvature between a forward edge and an aft edge of the accessory.

12. The aerofoil-aerofoil accessory assembly according to claim 8, wherein said pressure surface profile comprises an upstream concave portion configured for imparting a centrifugal force component to said particulate matter, and a downstream convex portion joined thereto at an inflexion point.

13. A method for modifying a geometry of a wing element with an aerofoil pressure surface accessory, the method comprising:

providing the wing element having an outer facing aerofoil surface and having wing sections in the form of at least one datum aerofoil section defining a datum profile, the wing element including a main primary element and a secondary element separated from said main primary element via a spacing, the wing element being designed for aerodynamic flight absent said accessory; and attaching the aerofoil pressure surface accessory to a pressure surface of the main primary element of the wing element, said aerofoil pressure surface accessory being selectively and reversibly attached to the wing element and configured for providing a modified geometric profile to the at least one datum aerofoil section with respect to the datum profile when said aerofoil pressure surface accessory is attached to the wing element, said aerofoil pressure surface accessory configured for maintaining a substantially fixed geometric profile with respect to the at least one datum aerofoil section at least whenever said wing element with said aerofoil pressure surface accessory thereon is airborne, said modified geometric profile being such as to provide said wing element with said aerofoil pressure surface accessory attached thereto with a desired change in performance relative to a datum performance provided by the wing element absent said aerofoil pressure surface accessory, and wherein said aerofoil pressure surface accessory provides said modified geometric profile in a manner that is fixed at least during flight, said aerofoil pressure surface accessory configured for minimizing or avoiding accretion of contaminant on said secondary element when subjected to an airflow comprising said contaminant, wherein the contaminant is in the form of particulate matter flowing in a downstream direction with respect to a leading edge of said main primary element; and wherein said pressure surface accessory includes a profile configured to ensure that at least some streamlines proximate to said pressure surface of said main primary element follow a path including over a suction surface of said secondary element spaced from the main primary element via said gap, while concurrently providing a trajectory to particulate matter flowing in said at least some streamlines proximate to said pressure surface of said main primary element to cause said particulate matter to overshoot said gap.

14. The method according to claim 13, wherein said pressure surface accessory is attached to the wing element when it is desired to minimize or prevent accretion of contaminants on the second element of said wing element.

15. A method of operating an air vehicle, comprising providing an air vehicle having fixed-wings, each said fixed wing including a wing leading edge;

providing a leading edge slot accessory for each said fixed wing, each said leading edge slot accessory being configured for being selectively and reversibly affixed to each said wing leading edge to provide a leading edge slot between the leading edge slot accessory and the wing leading edge, said fixed wings being designed for providing aerodynamic flight absent said leading edge slot accessory;

selectively affixing the leading edge slot accessory to each of the fixed wings to provide increased maximum lift performance of the thereby modified fixed wings to enable the air vehicle to take-off with a heavy payload for a predetermined mission under predetermined conditions as compared with a datum maximum lift performance obtained with said fixed wing absent said leading edge slot accessory, wherein under said predetermined conditions the corresponding said datum maximum lift performance of said fixed wings absent said leading edge slot accessory is insufficient for enabling take-off of the air vehicle with said heavy payload; and flying said air vehicle in said predetermined mission.

16. The method according to claim 15, further comprising removing the leading edge slot accessory from each of the fixed wings after termination of said predetermined mission.

17. The method according to claim 15, wherein said fixed wing comprises a wing element, the wing element comprising a primary element including at least a part of the wing leading edge, and a secondary element separated from the primary element via a spacing.

18. The method according to claim 15, wherein said leading edge slot accessory maintains a substantially fixed geometric profile with respect to the at least one datum aerofoil section of the fixed wing at least whenever said fixed wing with said leading edge slot accessory affixed thereon is airborne.

\* \* \* \* \*